US008634970B2

(12) United States Patent
Lee et al.

(10) Patent No.: US 8,634,970 B2
(45) Date of Patent: Jan. 21, 2014

(54) APPARATUS AND METHOD FOR VESSEL TRAFFIC MANAGEMENT

(75) Inventors: Hyung Kyu Lee, Daejeon (KR); Byung-Gil Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 229 days.

(21) Appl. No.: 13/309,763

(22) Filed: Dec. 2, 2011

(65) Prior Publication Data

US 2012/0150363 A1 Jun. 14, 2012

(30) Foreign Application Priority Data

Dec. 8, 2010 (KR) ........................ 10-2010-0124895

(51) Int. Cl.
*G05D 1/00* (2006.01)

(52) U.S. Cl.
USPC .................. 701/2; 701/21; 701/36; 701/117; 701/119; 340/984

(58) Field of Classification Search
USPC ................ 701/2, 21, 36, 117, 118, 119, 301; 340/988, 961, 984; 342/455
See application file for complete search history.

(56) References Cited

U.S. PATENT DOCUMENTS

| | | | | | |
|---|---|---|---|---|---|
| 3,691,978 | A * | 9/1972 | Bond | ........................ | 114/144 A |
| 4,446,729 | A * | 5/1984 | Watson, III | ................. | 73/178 R |
| 5,353,223 | A * | 10/1994 | Norton et al. | ................... | 702/17 |
| 5,404,135 | A | 4/1995 | Janex | | |
| 5,452,216 | A * | 9/1995 | Mounce | ........................ | 701/472 |
| 6,273,771 | B1 * | 8/2001 | Buckley et al. | ................. | 440/84 |

FOREIGN PATENT DOCUMENTS

| | | | |
|---|---|---|---|
| JP | 10-040500 | A | 2/1998 |
| KR | 1020070117244 | A | 12/2007 |
| KR | 1020080004825 | A | 1/2008 |

* cited by examiner

*Primary Examiner* — Gertrude Arthur Jeanglaude
(74) *Attorney, Agent, or Firm* — Ladas & Parry LLP

(57) ABSTRACT

An apparatus for vessel traffic management mounted in a vessel creates vessel sailing information including a current location and an identifier of the vessel in accordance with a navigation plan to a destination of the vessel; calculates an estimated time for arriving at the destination based on a distance between the current location and the destination and a sailing speed; and calculates an estimated entry time of entering a target area within the destination based on a distance between the current location and the destination and the sailing speed. The vessel sailing information, the estimated arrival time, and the estimated entry time are transmitted to a local control center, and the sailing of the vessel is controlled using a vessel traffic condition at the target area, provided from the local control center.

20 Claims, 4 Drawing Sheets

APPARATUS AND METHOD FOR VESSEL TRAFFIC MANAGEMENT

CROSS-REFERENCE TO RELATED APPLICATION(S)

The present invention claims priority of Korean Patent Application Nos. 10-2010-0124895, filed on Dec. 8, 2010, which is incorporated herein by reference.

FIELD OF THE INVENTION

The present invention relates to a technique for managing vessels sailing in the sea, and more particularly, to an apparatus and method for vessel traffic management through the prediction of a vessel traffic condition to a destination port to which the vessels are to enter.

BACKGROUND OF THE INVENTION

As well-known in the art, as for a technique related to sailing of a vessel, an E-Navigation technique proposed jointly by England, Japan, the United States, and so on was adopted as an agenda in international maritime organization (IMO) in 2006 and detailed execution plans was discussed to be established until 2012. To this end, research and development into an electronic navigation chart, an integrated intelligent navigation system, a communication device, and the like, in relation to electronic navigation have been gradually ongoing.

Thus, as one of methods thereof, a port management (or coastal port management) is generally used that controllers manage vessels entering a port by using location coordinates through the use of automatic identification systems (AISs) mounted in the vessels or satellites.

However, the method for performing the port management on vessels entering a port is not effective and has a difficulty when a large number of vessels simultaneously enter a port, which eventually causes various types of vessel collision accidents.

SUMMARY OF THE INVENTION

In view of the above, the present invention provides an apparatus and method for vessel traffic management through the prediction of a vessel traffic condition to a destination port to which the vessels are to enter.

In accordance with a first aspect of the present invention, there is provided an apparatus for vessel traffic management mounted in a vessel, the apparatus including:

a communication interface configured to perform data communication with a local control center;

a location recognition unit configured to obtain a current location of the vessel:

a sailing information creation unit configured to create vessel sailing information including the current location and an identifier of the vessel upon receipt of navigation plan to a destination of the vessel;

an arrival time calculation unit configured to periodically calculate an estimated time for arriving at the destination based on a distance between the current location and the destination and a sailing speed;

an entry time calculation unit configured to periodically calculate an estimated entry time of entering a target area within the destination based on a distance between the current location and the destination and the sailing speed; and a control unit configured to transmit the vessel sailing information, the estimated arrival time, and the estimated entry time to the local control center through the communication interface, and control the sailing of the vessel using vessel traffic condition at the target area, provided from the local control center through the communication interface.

In accordance with a second aspect of the present invention, there is provided a method for vessel traffic management in a vessel, the method including:

upon receipt of navigation plan to a destination of a vessel, creating vessel sailing information including a current location and an identifier of the vessel;

periodically calculating an estimated time for arriving at the destination based on a distance between the current location and the destination and a sailing speed;

periodically calculating an estimated entry time of entering a target area within the destination based on a distance between the current location and the destination and the sailing speed; and upon receipt of a vessel traffic condition at the target area of a destination control center, controlling the sailing of the vessel, wherein the vessel traffic condition has been predicted in relation to the estimated entry time.

In accordance with a third aspect of the present invention, there is provided an apparatus for vessel traffic management in a destination control center, the apparatus including:

a communication interface configured to perform data communication with each vessel;

a storage unit configured to store vessel sailing information and an estimated arrival time regarding each vessel received from the vessels through the communication interface;

a traffic condition predicting unit configured to predict vessel traffic condition at an estimated entry time of a particular vessel based on the estimated arrival time of the vessels; and a control unit configured to transmit the predicted vessel traffic condition to the particular vessel through the communication interface.

In accordance with a fourth aspect of the present invention, there is provided a method for vessel traffic management in a destination control center, the method including:

storing vessel sailing information and an estimated arrival time regarding each vessel to a destination;

receiving an estimated entry time when a particular vessel is to enter a target area of the destination is received;

predicting vessel traffic condition at the estimated entry time based on the estimated arrival time of said each vessel; and transmitting the predicted vessel traffic condition to the particular vessel.

In accordance with a fifth aspect of the present invention, there is provided a method for vessel traffic management, the method including:

upon receipt of a navigation plan of a vessel to a destination, creating vessel sailing information including a current location and an identifier of the vessel and transmitting the vessel sailing information to a destination control center by way of a local control center;

periodically calculating an estimated time for arriving at the destination based on a distance between the current location and the destination and a sailing speed, the calculated time being transmitted to the destination control center through the local control center;

periodically calculating an estimated entry of entering a target area within the destination based on the distance between the current location of the vessel and the destination and the sailing speed, the estimated entry time being transmitted to the destination control center through the local control center;

upon receipt of the estimated entry time of the vessel, predicting a vessel traffic condition at a target area of the destination based on the estimated arrival time of respective vessels; and transmitting the predicted vessel traffic condition to the vessel through the local control center.

BRIEF DESCRIPTION OF THE DRAWINGS

The above and other objects and features of the present invention will become apparent from the following description of embodiments, given in conjunction with the accompanying drawings, in which.

DETAILED DESCRIPTION OF THE EMBODIMENTS

Hereinafter, embodiments of the present invention will be described in detail with the accompanying drawings.

Figure 1:
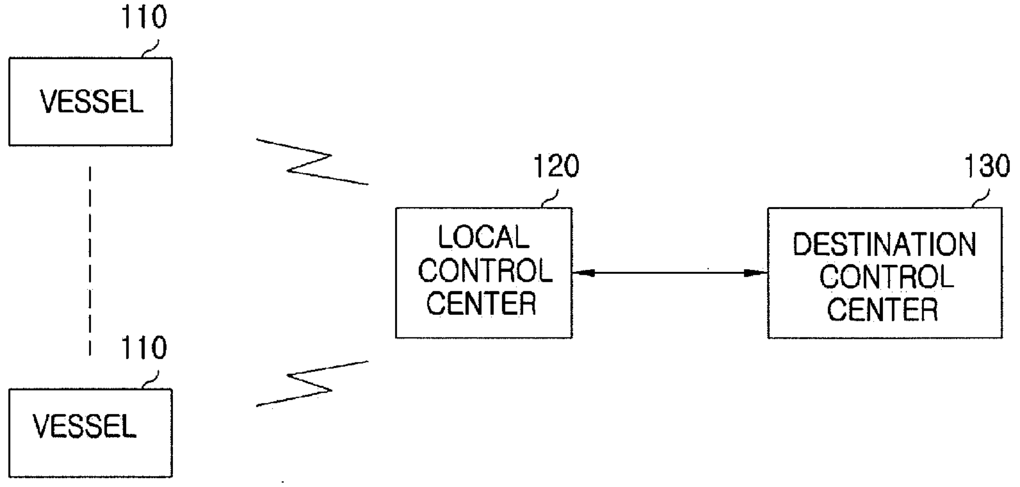
FIG. 1 shows a schematic diagram of a vessel management service system to provide a vessel management service through prediction in accordance with the present invention.

FIG. 1 shows a schematic diagram of a vessel management service system to provide a vessel traffic management service through prediction in accordance with an embodiment of the present invention.

The vessel management service system includes a group of vessels 110, a local management center and a destination management center 130.

In the vessel group 110, respective vessels 110/1 to **110/*n* refer to, for example, vessels which have entered to be within a management coverage of the local control center 120. Each of the vessels 110/1 to 110/*n*** has the apparatus for vessel traffic management in accordance with the present invention mounted therein.

Figure 2:
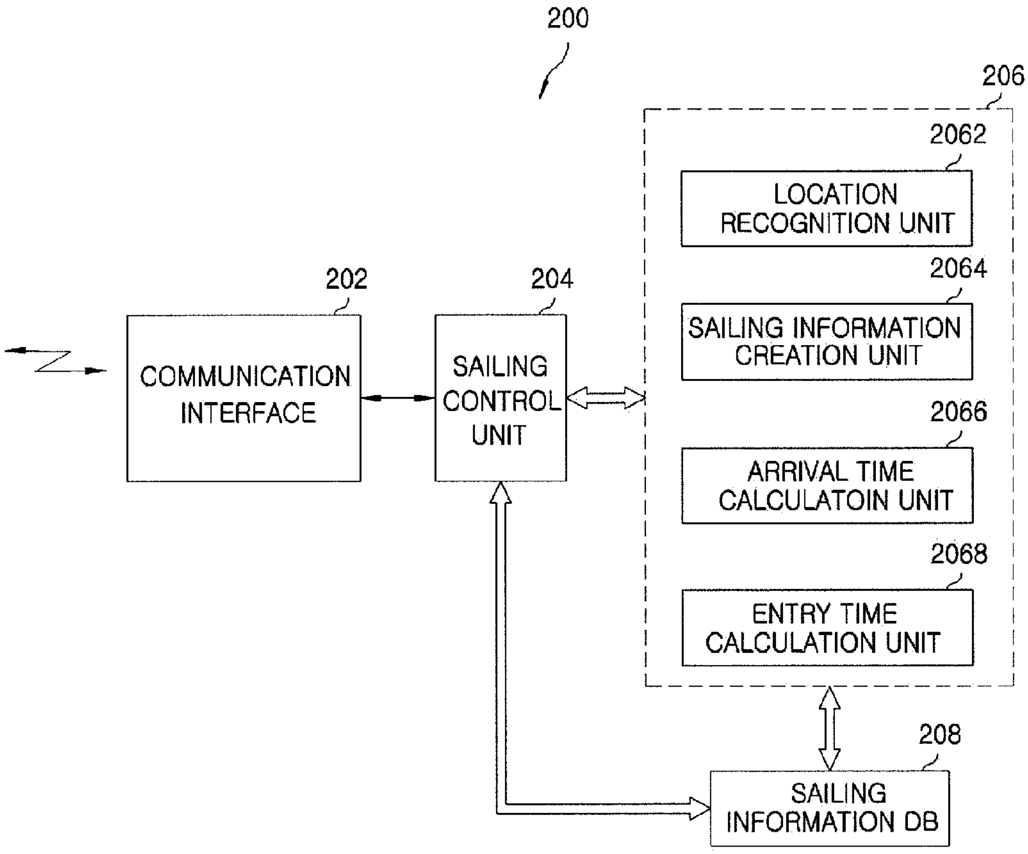
FIG. 2 illustrates a block diagram of an apparatus for vessel traffic management mounted in a vessel in accordance with an embodiment of the present invention.

FIG. 2 illustrates a block diagram of an apparatus for vessel traffic management mounted in a vessel in accordance with an embodiment of the present invention.

In order to enjoy a vessel management service through prediction, the apparatus 200 for vessel traffic management provides functions of generating information regarding vessel sailing including navigation plan, vessel location, or a vessel identifier; information regarding an estimated time to arrive at a destination; and information regarding an estimated time to enter a target area within the destination, which will then be transmitted to the local control center 120. The navigation plan may include, for example, information regarding a point of departure, an intermediate point, a destination, a sailing speed, a vessel size, a vessel type, and the like.

A vessel traffic condition at the target area is predicted from the estimated entry time received from the local control center 120. As shown in FIG. 2, the apparatus 200 includes a communication interface 202, a sailing control unit 204, a sailing management module 206, and a sailing data DB 208. The sailing management module 206 includes a location recognition unit 2062, a sailing information creation unit 2064, an arrival time calculation unit 2066, and an entry time calculation unit 2068.

The communication interface 202 may be a wired/wireless communication unit such as a network interface card for interfacing data communication between the sailing control unit 204 and the local control center 120 shown in FIG. 1. The communication interface 202 serves to modulate information related to vessel sailing, estimated arrival time, and estimated entry time, selectively transferred from the sailing control unit 204 into an appropriate signal for transmission through a network, for example, the wire/wired Internet, and transmits the modulated signal to the local control center 120. Further, the communication interface 202 demodulates information regarding a vessel traffic condition in a target area estimated in relation to the estimated entry time received from the local control center 120 to provide the demodulated data to the sailing control unit 204. In this case, an identifier of the vessel may be transmitted along with the vessel sailing information, the estimated arrival time, and the estimated entry time from the vessel to the local control center.

The sailing control unit 204, which may be a conventional microprocessor for controlling an overall operations of the apparatus 200 mounted in the vessel. When a user inputs information regarding a point of departure, an intermediate point, a destination, and/or a sailing speed through an input device such as a keypad, a touch pad, a touch screen, or the like (not shown), the sailing control unit 204 stores the information in the sailing data DB 208. The sailing control unit 204 also transfers information regarding the vessel sailing, the estimated arrival time, and the estimated entry time of the vessel selectively provided from the sailing management module 206 to the communication interface 202. In addition, the sailing control unit 204 provides a vessel traffic condition in a target area estimated in relation to the estimated entry time, which is transmitted through the communication interface 202 from the local control center 120, to a monitor to display it, or stores the information in the sailing data DB 208. The sailing data DB 208 stores therein the vessel sailing information including navigation plan such as information regarding a point of departure, an intermediate point, a destination, a sailing speed, a vessel size, and a vessel type, a location of the vessel such as a GPS coordinate, and a vessel identifier, and the vessel traffic condition information received from the destination control center 130 by way of the local control center 120.

The location recognition unit 2062 generates location information (e.g., a GPS coordinate) of the vessel through a satellite location-based service. The location information may be stored in the sailing data DB 208.

When a user, e.g., a captain or a mate inputs a point of departure, an intermediate point, and/or a destination, the sailing information creation unit 2064 retrieves the navigation plan, the vessel location, and vessel identifier from the sailing data DB 208 under a control of the sailing control unit 204 to create vessel sailing information. The vessel sailing information is then transferred to the sailing control unit 204 so that the vessel sailing information can be finally transmitted to the destination control center 130 by way of the local control center 120.

The arrival time calculation unit 2066 periodically calculates an estimated arrival time at which the vessel may arrive at the destination based on the distance between the current location of the vessel and the destination, and the sailing speed. The estimated arrival time transferred to the sailing control unit 204 in response to a control command from the sailing control unit 204. Here, the calculation and transmission of the estimated arrival time may be periodically performed until such time as the vessel, which has left the point of departure, arrives at the destination, or may be performed from the time when the vessel arrives at a preset distance (e.g., 50 miles, 60 miles, 70 miles, or the like) from the destination.

The entry time calculation unit 2068 periodically calculates an estimated entry time at which the vessel may enter a target area within the destination based on the distance between the current location of the vessel and the destination, and the sailing speed. The estimated entry time is then transferred to the sailing control unit 204 under a control of the sailing control unit 204. Similarly, the calculation and transmission of the estimated entry time may be periodically performed until such time as the vessel, which has left the point of departure, arrives at the destination, or may be performed from the time when the vessel arrives at a preset reference distance (e.g., 50 miles, 60 miles, 70 miles, or the like) from the destination.

Referring again to FIG. 1, the local control center 120 provides a vessel management service to each vessel 110 which has entered its management coverage. More particularly, the local control center 120 receives the vessel sailing information, estimated arrival time, and estimated entry time that are periodically or aperiodically transmitted from the apparatus 200 in each vessel 110, which will be transmitted to the remote destination control center 130. The local control center 120 also receives the vessel traffic condition information from the destination control center 130 and wirelessly broadcasts it to the apparatus 200 in each vessel 110 which has entered its management coverage. In this regard, the communication between the local control center 120 and the destination control center 130 may be made through a wired network or a wireless network using the Internet.

In the present embodiment, the local control center 120 provides a service allowing the apparatus 200 in each vessel 110 which has entered its management coverage and the destination control center 130 to exchange information, but the present invention is not necessarily limited thereto. That is, of course, it may serve as a destination control center with respect to vessels that are destined for a port within the management coverage of the destination control center depending on a situation.

Also, with the change of a management coverage due to the sailing of a vessel toward the destination, the local control center may be changed to another local control center. For example, on the assumption that a local control center 'A' manages an area 'A' of its management coverage and a local control center 'B' manages an area 'B' adjacent to the area 'A' of its management coverage, when a vessel moves from the area 'A' to the area 'B', the vessel may enjoy the management service from the local control center 'A' to the local control center 'B'.

The destination control center 130 includes an apparatus for vessel management provided in accordance with the present invention, which serves to provide a vessel management service to each vessel 110 through prediction in accordance with the present invention, which will be discussed in FIG. 3.

Figure 3:
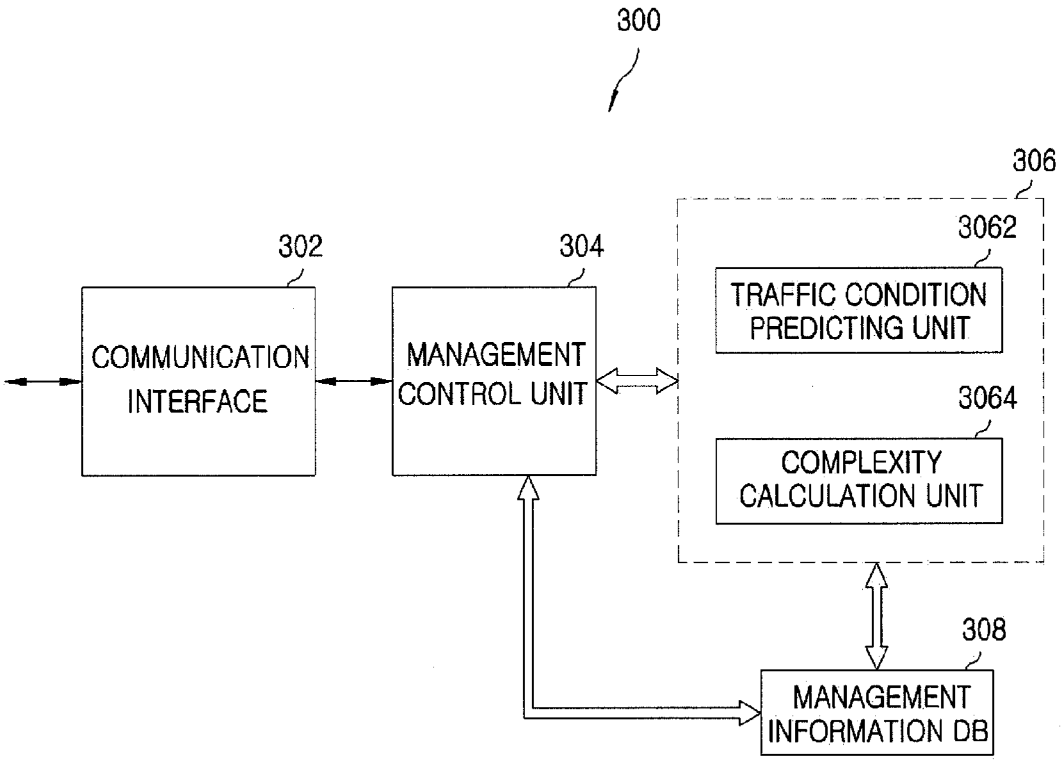
FIG. 3 presents a block diagram of a vessel management device provided in a destination control center in accordance with an embodiment of the present invention.

FIG. 3 illustrates a block diagram of an apparatus for vessel traffic management provided in a destination control center 130 in accordance with an embodiment of the present invention. The apparatus 300 includes a communication interface 302, a management control unit 304, a management module 306, and a management information DB 308. The management module 306 includes a traffic condition predicting unit 3062, a complexity calculation unit 3064.

The communication interface 302 includes a wired/wireless communication unit for interfacing data communication between the destination control center 130 and the local control center 120. The communication interface 302 serves to demodulate the vessel sailing information, estimated arrival time and estimated entry time of each vessel 110 selectively transferred from the local control center 120 into the original data before being modulated and transfers the same to the management control unit 304. The communication interface 302 also modulates information regarding the vessel traffic condition in a target area estimated in relation to the estimated entry time of the vessel 110 provided from the management control unit 304 into an appropriate signal for transmission through a network, and transmits the same to the local control center 120. Here, the vessel sailing information, the estimated arrival time and the estimated entry time contains an identifier for the local control center and an identifier for the vessel 110.

The management control unit 304, which may be a conventional microprocessor for controlling an overall operation of the apparatus 300 provided, for example, in the destination control center 130. The management control unit 304 stores the vessel sailing information, the estimated arrival time, and the estimated entry time of each vessel 110 received through the communication interface 302 in the management information DB 308. When the estimated entry time is received from a remote vessel, the management control unit 304 allows the management module 306 to predict a vessel traffic condition. The estimated entry time may be regarded as a message for requesting a vessel traffic condition estimated when the vessel enters the target area.

When the complexity calculation unit 3064 informs that the traffic complexity of vessels is greater than a threshold value, the management control unit 304 serves to transfer the vessel traffic condition at the estimated entry time produced by the traffic condition predicting unit 3062 to the communication interface 302.

To this end, the management information DB 308 stores the vessel sailing information, estimated arrival time and estimated entry time, vessel traffic condition, and traffic complexity, regarding each vessel 110.

When the estimated time at which a vessel enters the destination is received from a local control center, under a control of the management control unit 304, the traffic condition predicting unit 3062 infers the vessel traffic condition at the estimated time at which the vessel enters the target area of the destination based on the estimated arrival time of each vessel 110 stored in the management information DB 308. The vessel traffic condition is stored in the management information DB 308 and the generation of the vessel traffic condition is notified to the complexity calculation unit 3064.

The complexity calculation unit 3064 serves to check vessel traffic condition at the estimated entry time. When the checked traffic complexity is determined to be greater than a threshold value, the complexity calculation unit 3064 transmits the vessel traffic condition indicating that it is greater than a threshold to the management control unit 304. As an example, on the assumption that an appropriate number of vessels at a target area that the vessel is estimated to enter is 100, when the number of vessels that enter at the estimated entry time exceeds 10% or 20% of the appropriated number of vessels, the complexity calculation unit 3064 determines that the number of vessels is greater than the threshold value.

Meanwhile, each vessel 110 which has entered the management coverage of the destination control center 130 periodically wirelessly transmits its current location to the destination control center 130 through the apparatus 200. In response thereto, the traffic condition predicting unit 3062 periodically predicts the vessel traffic condition within the management coverage based on the current location of each vessel 110 which has entered the management coverage of the destination control center 130 under a control of the management control unit 304. The management control unit 304 then periodically broadcast the vessel traffic condition within the management coverage to every vessel which has entered the management coverage through the communication interface 302.

Also, vessel sailing information, estimated arrival time and estimated entry time regarding each vessel 110 which sails toward the management coverage of the destination control center 304 is collected in real time and comprehensively or integrally managed. Thus, the destination control center 304 can establish a management plan through the prediction in advance outside the management coverage of the vessel, thereby realizing an effective vessel management and enhancing management work efficiency. Therefore, each vessel 110 can be provided with a management service reflecting the vessel traffic condition of the destination through the local control center 304 before each vessel 110 arrives at the destination.

Figure 4:
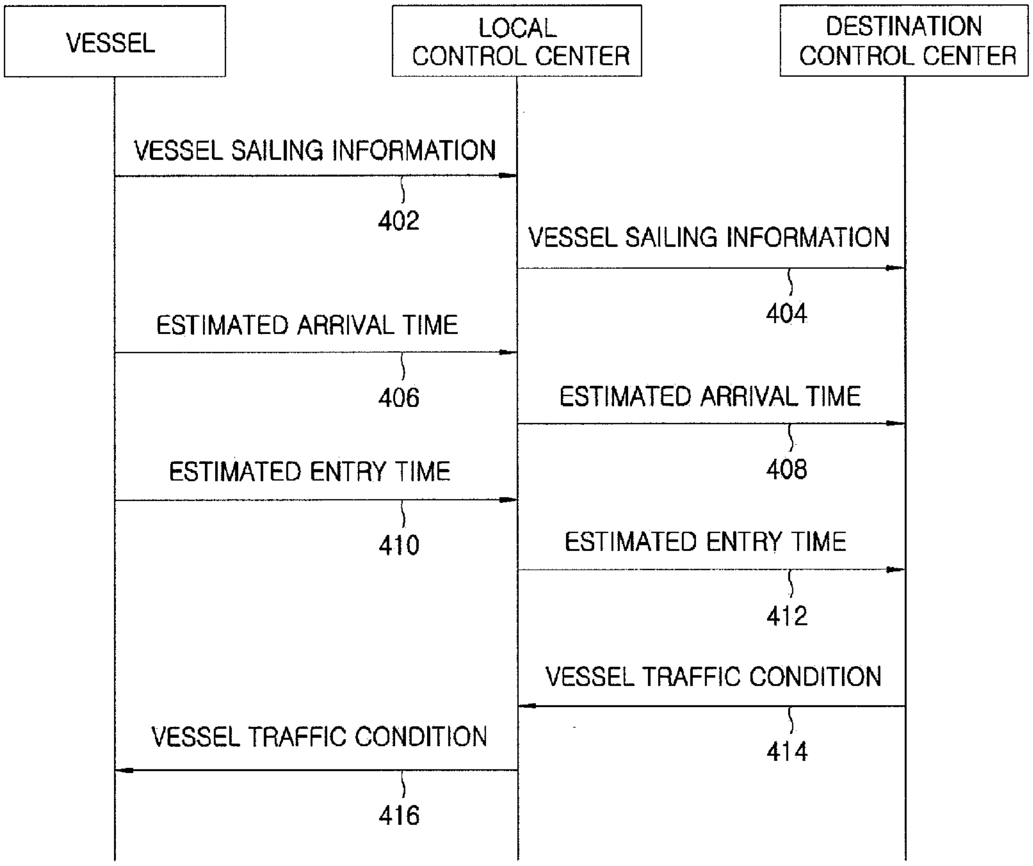
FIG. 4 is a flowchart illustrating a method of providing a vessel management service through prediction by exchanging information among a vessel, a local control center and a destination control center in accordance with an embodiment of the present invention.

FIG. 4 is a flowchart illustrating a method of providing a vessel management service through prediction by exchanging information among a vessel, a local control center and a destination control center in accordance with an embodiment of the present invention.

First of all, when a user, e.g., a captain or a mate inputs information regarding a point of departure, an intermediate point, a destination, a sailing speed, and the like, the apparatus 200 creates vessel sailing information including a sailing plan (e.g., a point of departure, an intermediate point, a destination, a sailing speed.), a vessel size, a vessel type and a vessel identifier, and wirelessly transmits the created vessel sailing information to the local control center 120 in step 402.

Next, in step 404, the local control center 120 appends an identifier for the local control center 120 to the vessel sailing information received from the vessel and transmits the vessel sailing information to the remote destination control center 130. The destination control center 130 stores the received vessel sailing information of the vessel in the management information DB 308.

After that, in step 406, the apparatus 200 periodically calculates an estimated arrival time at which the vessel 110 may arrives at a destination based on the distance between a current location of the vessel 110 and the destination, and the sailing speed. The estimated arrival time is then wirelessly transmitted to the local control center 120. Here, the estimated arrival time may be continuously periodically calculated until such time as the vessel, which has left the point of departure, arrives at the destination, or may be periodically calculated from the time when the vessel arrives at a preset reference distance (e.g., 50 miles, 60 miles or 70 miles) from the destination. In response, the local control center 120 appends in step 408, an identifier for the local control center 120 to the estimated arrival time which has been received from the vessel 110, and transmits the same to the remote destination control center 130. The destination control center 130 then stores the estimated arrival time of the vessel 110 in the management information DB 308.

Here, the estimated arrival time of each vessel stored in the management information DB 308 is basic information used for generating the vessel traffic condition to be provided to another vessels sailing to the management coverage of the destination control center 130.

Thereafter, in step 410, the apparatus 200 calculates an estimated entry time at which the vessel 110 will enter a target area within the destination at every preset periods based on the distance between the current location of the vessel 110 and the destination, and the sailing speed. The estimated entry time is periodically wirelessly transmitted to the local control center 120. Here, the estimated entry time may be periodically calculated until such time as the vessel, which has left the point of departure, arrives at the destination, or may be periodically calculated from the time when the vessel arrives at a preset reference distance (e.g., 50 miles, 60 miles or 70 miles) from the destination.

Subsequently, in step 412, the local control center 120 appends an identifier for the local control center 120 to the estimated entry time which has been received from the vessel 110. The estimated entry time is then transmitted to the destination control center 130 at remote location.

In response, in step 414, the destination control center 130 predicts a vessel traffic condition of the target area in relation to the estimated entry time by using the vessel sailing information, an estimated time for arriving at the destination, an estimated entry time at which each vessel enters the target area within the destination. The predicted vessel traffic condition to the local control center 120.

At this point, the destination control center 130 checks the predicted vessel traffic condition, and only when the traffic complexity is determined to be greater than a threshold value, the destination control center 130 may be configured to transmit the predicted vessel traffic condition to the local control center 120. That is, the estimated entry time transferred to the destination control center 130 may be a message for requesting a vessel traffic condition predicted when the vessel enters the target area. Upon receipt of the estimated entry time, the destination control center 130 predicts the vessel traffic condition to transmit the same to the vessel 110.

Thus, in step 416, the apparatus 200 receives the predicted vessel traffic condition at the estimated vessel entry time and if necessary displays it to a monitor. Accordingly, each vessel 110 can be provided with a management service in consideration of the predicted vessel traffic condition in the destination through the local control center 120 before each vessel arrives at the destination.

In FIG. 4, it has been described and illustrated that the vessel 110 creates the estimated arrival time and transmits the same to the destination control center 130, and then, creates the estimated entry time and transmits the same to the destination control center 130. However, these are merely illustrated for convenience of explanation and to increase understanding of the present invention and the present invention is not limited thereto. Namely, it will be understood that the estimated arrival time and estimated entry time may be individually or separately transmitted or simultaneously transmitted such that transmission intervals of the estimated arrival time and the estimated entry time coexist.

While the invention has been shown and described with respect to the particular embodiments, it will be understood by those skilled in the art that various changes and modification may be made without departing the scope of the present invention as defined in the following claims.

What is claimed is:

1. An apparatus for vessel traffic management mounted in a vessel, the apparatus comprising:

a communication interface configured to perform data communication with a local control center;

a location recognition unit configured to obtain a current location of the vessel;

a sailing information creation unit configured to create vessel sailing information including the current location and an identifier of the vessel upon receipt of navigation plan to a destination of the vessel;

an arrival time calculation unit configured to periodically calculate an estimated time for arriving at the destination based on a distance between the current location and the destination and a sailing speed;

an entry time calculation unit configured to periodically calculate an estimated entry time of entering a target area within the destination based on a distance between the current location and the destination and the sailing speed; and a control unit configured to transmit the vessel sailing information, the estimated arrival time, and the estimated entry time to the local control center through the communication interface, and control the sailing of the vessel using vessel traffic condition at the target area, provided from the local control center through the communication interface.

2. The apparatus of claim 1, wherein the navigation plan includes information regarding an intermediate point, a sailing speed, a vessel size, and a vessel type.

3. The apparatus of claim 1, wherein the estimated entry time is calculated from the time when the distance between the current location of the vessel and the destination is within a preset reference distance.

4. The apparatus of claim 1, wherein the vessel traffic condition is provided to the vessel within a management coverage of the destination control center via the local control center.

5. The apparatus of claim 4, wherein the vessel traffic condition is provided to the vessel when traffic complexity at the estimated entry time is greater than a threshold value.

6. A method for vessel traffic management in a vessel, the method comprising:

upon receipt of navigation plan to a destination of a vessel, creating vessel sailing information including a current location and an identifier of the vessel;

periodically calculating an estimated time for arriving at the destination based on a distance between the current location and the destination and a sailing speed;

periodically calculating an estimated entry time of entering a target area within the destination based on a distance between the current location and the destination and the sailing speed; and upon receipt of a vessel traffic condition at the target area of a destination control center, controlling the sailing of the vessel, wherein the vessel traffic condition has been predicted in relation to the estimated entry time.

7. The method of claim 6, wherein the navigation plan includes information regarding an intermediate point, a sailing speed, a vessel size, and a vessel type.

8. The method of claim 6, wherein the estimated entry time is calculated from the time when the distance between the current location of the vessel and the destination is within a preset reference distance.

9. The method of claim 6, wherein the vessel traffic condition is provided to the vessel within a management coverage of the destination control center.

10. The method of claim 9, wherein the vessel traffic condition is provided to the vessel when traffic complexity at the estimated entry time is greater than a threshold value.

11. An apparatus for vessel traffic management in a destination control center, the apparatus comprising:

a communication interface configured to perform data communication with each vessel;

a storage unit configured to store vessel sailing information and an estimated arrival time regarding each vessel received from the vessels through the communication interface;

a traffic condition predicting unit configured to predict vessel traffic condition at an estimated entry time of a particular vessel based on the estimated arrival time of the vessels; and a control unit configured to transmit the predicted vessel traffic condition to the particular vessel through the communication interface.

12. The apparatus of claim 11, wherein the control unit is further configured to check traffic complexity of the vessel traffic condition, and transmit the vessel traffic condition to the particular vessel when the traffic complexity is greater than a threshold value.

13. The apparatus of claim 11, wherein the vessel traffic condition is produced based on a current location of the respective vessels which have entered a management coverage of the destination control center, and wherein the vessel traffic condition is broadcast to each of the vessels which have entered the management coverage.

14. The apparatus of claim 13, wherein the vessel traffic condition is produced at preset certain periods.

15. A method for vessel traffic management in a destination control center, the method comprising:

storing vessel sailing information and an estimated arrival time regarding each vessel to a destination;

receiving an estimated entry time when a particular vessel is to enter a target area of the destination is received;

predicting vessel traffic condition at the estimated entry time based on the estimated arrival time of said each vessel; and transmitting the predicted vessel traffic condition to the particular vessel.

16. The method of claim 15, further comprising:

checking traffic complexity of the generated vessel traffic condition; and when the traffic complexity is greater than a threshold value, transmitting the vessel traffic condition to the particular vessel.

17. The method of claim 15, further comprising:

generating a vessel traffic condition within a management coverage of the destination control center based on a current location of respective vessels which have entered the management coverage; and broadcasting the vessel traffic condition within the management coverage to the respective vessels.

18. The method of claim 17, wherein the vessel traffic condition within the management coverage is produced at preset certain periods.

19. A method for vessel traffic management, the method comprising:

upon receipt of a navigation plan of a vessel to a destination, creating vessel sailing information including a current location and an identifier of the vessel and transmitting the vessel sailing information to a destination control center by way of a local control center;

periodically calculating an estimated time for arriving at the destination based on a distance between the current location and the destination and a sailing speed, the calculated time being transmitted to the destination control center through the local control center;

periodically calculating an estimated entry of entering a target area within the destination based on the distance between the current location of the vessel and the destination and the sailing speed, the estimated entry time being transmitted to the destination control center through the local control center;

upon receipt of the estimated entry time of the vessel, predicting a vessel traffic condition at a target area of the destination based on the estimated arrival time of respective vessels; and transmitting the predicted vessel traffic condition to the vessel through the local control center.

20. The method of claim 19, further comprising:

checking traffic complexity for the predicted vessel traffic condition; and when the traffic complexity is greater than a threshold value, transmitting the predicted vessel traffic condition to the vessel.

* * * * *